Jan. 21, 1964    Q. D. DE MUTH    3,118,182
APPARATUS FOR FORMING OPTICALLY SUPERIOR AIRCRAFT CANOPIES
Filed Jan. 3, 1963    4 Sheets-Sheet 1

INVENTOR.
QUENTIN D. DEMUTH
BY
ATTORNEY

Jan. 21, 1964  Q. D. DE MUTH  3,118,182
APPARATUS FOR FORMING OPTICALLY SUPERIOR AIRCRAFT CANOPIES
Filed Jan. 3, 1963  4 Sheets-Sheet 3

INVENTOR.
QUENTIN D. DEMUTH
BY
ATTORNEY

Jan. 21, 1964

Q. D. DE MUTH 3,118,182

APPARATUS FOR FORMING OPTICALLY SUPERIOR AIRCRAFT CANOPIES

Filed Jan. 3, 1963

INVENTOR.
QUENTIN D. DEMUTH
BY
*M. Oldham*
ATTORNEY

United States Patent Office 3,118,182
Patented Jan. 21, 1964

3,118,182
APPARATUS FOR FORMING OPTICALLY
SUPERIOR AIRCRAFT CANOPIES
Quentin D. De Muth, Buckeye, Ariz., assignor to Goodyear Aerospace Corporation, a corporation of Delaware
Filed Jan. 3, 1963, Ser. No. 249,213
4 Claims. (Cl. 18—19)

This invention relates to the apparatus for forming optically superior aircraft canopies, and, more particularly, deals with the structure of the mold and the process steps to develop the finished canopy.

Heretofore it has been known that there are many and varied types of airplane canopies and other types of canopies which have been made in many and varied manners. Most canopies used to be free blown, but when more complex shapes and better optical results with different materials were desired it was found that free blown canopies were no longer suitable. Free blowing has been followed by mold forming at temperatures allowing only for creep forming of the materials and this has been a satisfactory process for most materials. However, because of the low flow capability of stretched acrylic at its maximum allowable forming temperatures it was found that the conventional forming methods of stretched acrylic would not yield a canopy with satisfactory optical qualities. When an object was viewed through a conventionally formed acrylic canopy at a very shallow angle of incidence which is required for certain specifications the optical qualities were very clouded and unsatisfactory. Studies have shown that the optical aberrations that occur in most materials and especially stretched acrylic during conventional forming are due in large part to compression buckling in the material which developed as the material forms into a contoured canopy shape. Thus, the proper optical qualities of the formed acrylic can not be achieved in the conventional tools and in the conventional manner because compression buckling can not be avoided.

It is the general object of the invention to avoid and overcome the foregoing and other difficulties of the prior art practices by the provision of a means of preloading the stretched acrylic material tensile-wise so that while the forming of the acrylic is taking place the compression forces set up within the material are cancelled out or even out weighed by the tensile forces introduced into the canopy material by the tool of the invention.

Another object of the invention is to provide a tool to form acrylic material into canopies having superior optical qualities at no increase in cost over present equipment and procedures.

Another object of the invention is to provide a canopy forming tool wherein one end of the tool is adapted to fixedly engage and clamp the canopy material thereto, and which is pivotally mounted at its base so that it can be pivoted to create tensional stress in the canopy during the forming process.

Another object of the invention is to provide a unique seal means between the canopy material and the forming vessel to thereby use a vacuum forming process for the canopy.

The aforesaid objects of the invention and other objects which will become apparent as the description proceeds, are achieved by providing a canopy forming tool having one fixed hoop end and one pivotal hoop end mounted at opposite ends of a forming vessel on an understructure, which hoops are so shaped to receive a half cylindrically-shaped sheet of acrylic material which is securely clamped at each end to the respective hoops, which tool has a flexible bellows seal between the material at the pivotal hoop end and the forming vessel, which pivotal hoop is pivoted by jacking means away from the fixed hoop to thereby induce a tensional stress at right angles to the girth direction of the material thereby offsetting the compressional forces induced into the stretched acrylic as the vacuum forming process takes place, which tensile stress is increased as necessary during the forming process to insure that the tensile stress is always greater than the compressional stress of the material, and which canopy when so formed and cooled has superior optical qualities, especially when viewed through at low angles of incident to the plane of surface of the canopy.

For a better understanding of the invention reference should be had to the accompanying drawings, wherein.

Figure 1:
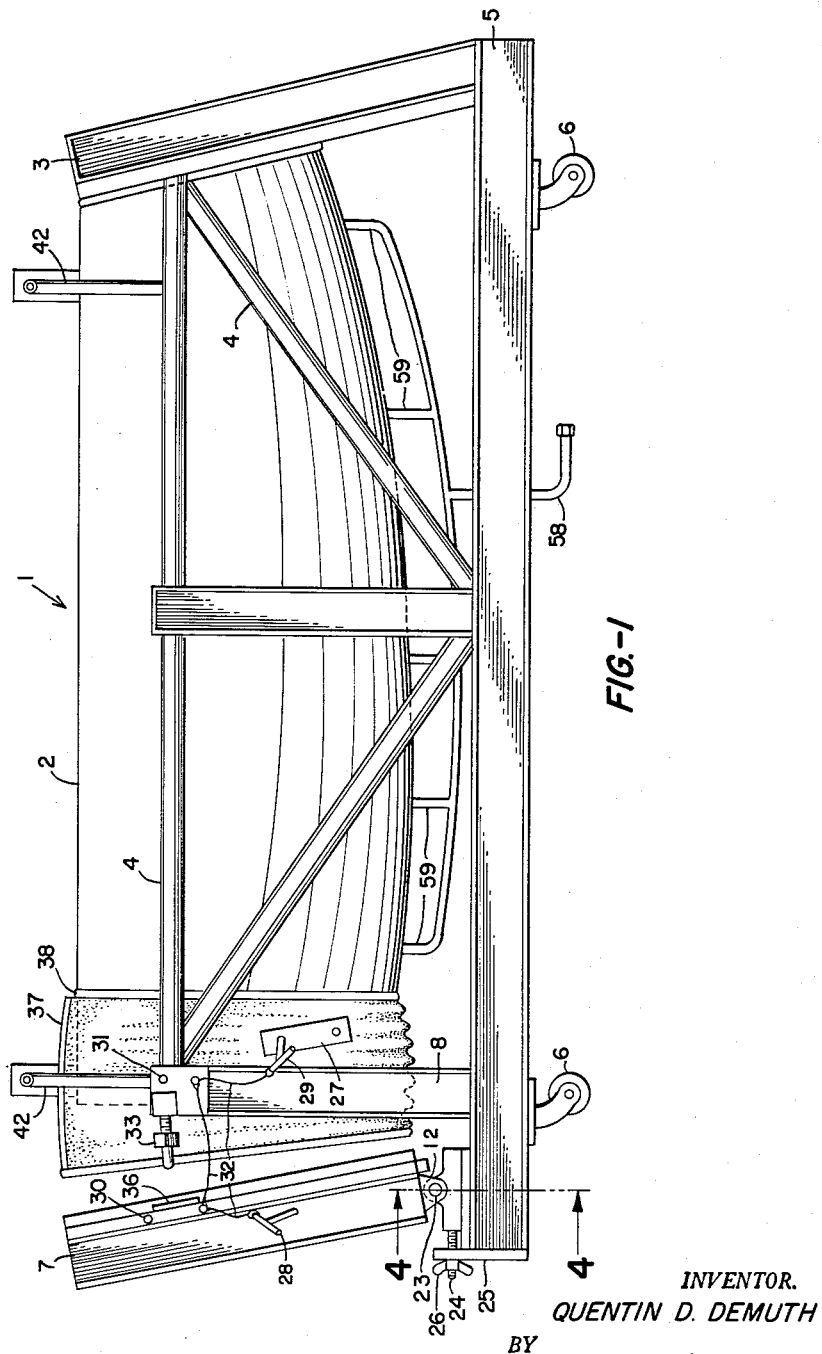
FIGURE 1 is a front elevation of one best known embodiment of a canopy mold tool including the principles of the invention.

With specific reference to the form of the invention illustrated in the drawings, the numeral 1 indicates generally a large tool for forming aircraft canopies having superior optical qualities. The tool 1 consists of a mold or vessel 2 streamlined front to rear and having a shape exactly that of the canopy to be formed but somewhat larger in size with respect to canopy length and girth dimensions. The vessel 2 is mounted at one end in a fixed hoop 3 and at the other end by the understructure frame 4. The understructure frame 4 actually also helps support the fixed hoop 3 and both the understructure frame 4 and the fixed hoop 3 are fixedly secured to a rigid strong base frame 5. The entire tool is made movable as by mounting on pivotal caster wheels 6.

At the end of the tool opposite the fixed hoop 3 a hoop 7, similar to the hoop 3, is mounted for pivotal and longitudinal movement in respect to the tool 1. The pivotal hoop 7 is slightly wider and deeper than the fixed hoop 3 so that it will conform to that end of the forming vessel 2. With specific reference to FIGURE 3, it can be seen that the pivotal hoop 7 comprises a rigid C-shaped integral frame 8 with both legs of the C deviating upwardly and outwardly from the vertical to generally conform to the shape of the vessel 2 but slightly larger. A narrow C-shaped plate 9 is welded to a filler and supporting plate 10 which is welded to the frame 8 with the supporting plate 10 filling the space between the plate 9 and frame 8. The plate 9 conforms exactly to the shape of the vessel 2 at that end of the vessel. Supporting braces 11 are placed at the corners of the C-shaped frame 8 to thereby strengthen the entire pivotal hoop. Extending ears 12 in pairs on both sides of the frame 8 are welded to the frame 8. The ears 12 have holes 13 therethrough which are adapted to receive means to pivotally mount the pivotal hoop 7.

The fixed hoop 3 is constructed in exactly the same manner as the pivotal hoop 7 except that its hoop opening is smaller and it is not pivotally mounted. However, its ring plate 9a, supporting plate, frame, and supporting braces are similar to the pivotal hoop 7 and are therefore not illustrated in detail.

Figure 4:
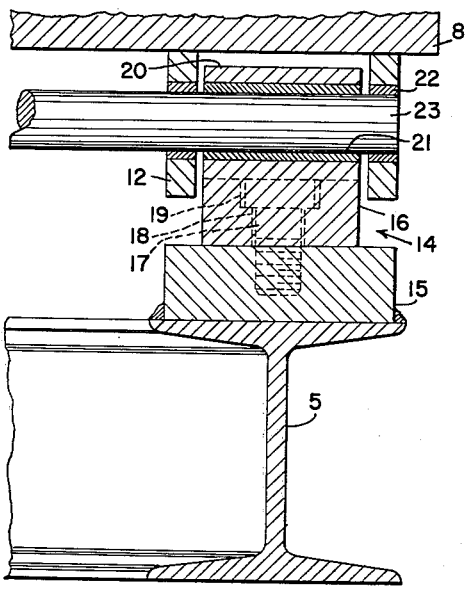
FIGURE 4 is an enlarged fragmentary vertical cross sectional view taken on line 4—4 of FIGURE 1.
Figure 8:
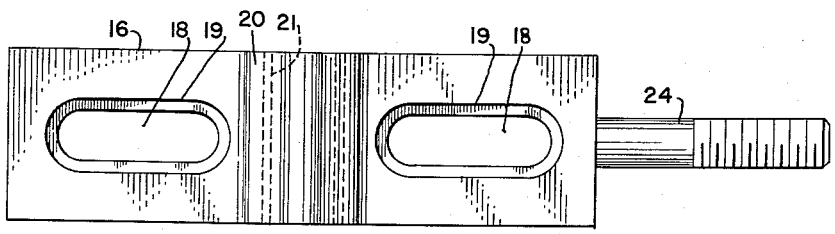
FIGURE 8 is a top elevation of the longitudinally slidable bar that pivotally supports the pivotal hoop of the invention.

With specific reference to FIGURE 4, it can clearly be seen how the ears 12 fit over the pivotal mounting means generally denoted by 14. The pivotal mounting means 14 comprises a base plate 15 which is welded to the frame 5. A slidable plate 16 fits on top of the fixed plate 15 and is slidably mounted by a plurality of screws 17 through slots 18 in the plate 16. The relation of the slots 18 to the plate 16 can best be seen in FIGURE 8. It is noted that widened counter bores 19 extend around the tops of the slots to receive the heads of the screws 17. The screws 17 are only turned down far enough to hold the plate from lateral movement, but to permit longitudinal movement thereof. A bearing housing 20 forms an integral upwardly extending portion of the plate 16, and carries a sleeve type bearing 21 therein. Each hole 14 of the ears 13 extending from the frame 8 also carries a small sleeve bearing 22. To pivotally position the hoop 7 the holes 13 are lined up with the hole through the bearing 21 and a long pivot bar 23 is positioned therethrough to pivotally hold both pairs of ears 12 of the hoop 7 in pivotal relation on the mounting means 14. Normally, the bar 23 fits freely in the bearing 21 of the mounting means 14, but fits rather snugly in the bearings 22 of the ears 12. Thus, when the hinged hoop 7 is pivoted the bar 23 rotates in the bearing 21 of the mounting means 14 but remains stationary in the bearings 22 of the ears 12.

Figure 2:
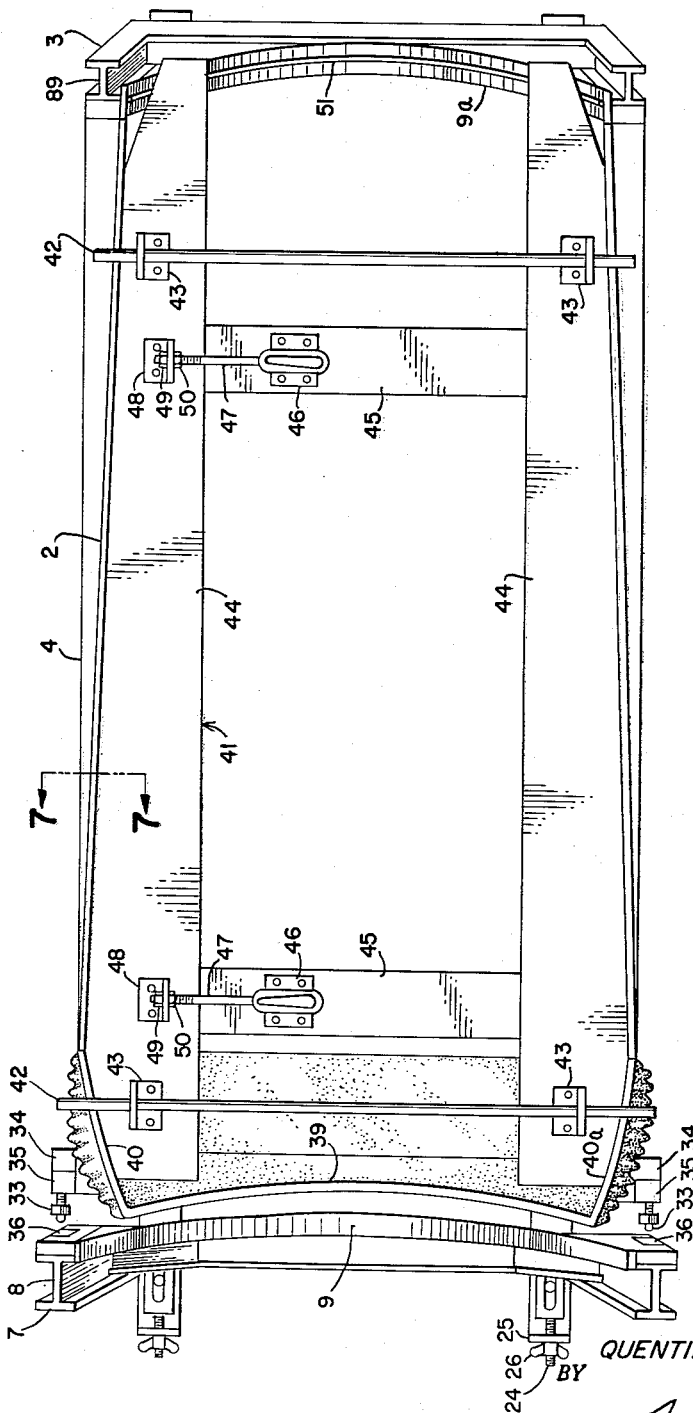
FIGURE 2 is a top plan view of the tool of FIGURE 1.

As seen in FIGURES 1 and 2 a stud 24 is welded to the sliding plate 16 and extends slidably through a guide plate 25 which is welded to the frame 5. A large wing nut 26 screws onto the stud 24 to thereby provide means for the longitudinal movement of the pivotal hoop 7. Normally, to set the machine up the pivotal hoop 7 is moved longitudinally toward the fixed hoop 3 as closely to the vessel 2 as possible so that the wing nut 26 is barely threaded onto the stud 24.

With reference to FIGURE 1 it can be seen that a loosely hung bar 27 may be provided with pins 28 and 29 so that the bar can be positioned to hold the pivotal hoop 7 in position during the initial set up process. The bar 27 is secured from the frame 4 to the pivotal hoop 7 with the pins 28 and 29 extending through the bar and into the holes 30 and 31 respectively on the hoop and the frame. Small wires 32 may be used to hold the pins and/or the bar when not in place and also to limit the maximum pivotal movement of the hoop 7 away from the fixed hoop 3.

Jack screws 33 as best seen in FIGURES 1 and 2 are mounted at the top of each side of the vertically extending supporting members 8b of the understructure 4 nearest to the pivotal hoop 7. In the preferred embodiment, a supporting block 34 is welded to the previously mentioned vertically extending supporting member 8b of the understructure 4 and a jack screw receiving housing 35 is then welded into a cut away corner of the supporting block 34. The jack screws 33 are adapted to engage with a small plate 36 welded to the frame 8 of the pivotal hoop 7.

A U-shaped flexible bellows 37 at its end remote from the pivotal hoop 7 is fixedly attached airtight as by band 38 to the outside of the vessel 2 near the pivotal hoop end. The other or open end and opened top of the U-shaped bellows 37 normally hang free until the canopy material is placed in the vessel 2. As clearly seen in FIGURE 2, an edge band 39 extends around the open end of the U-shaped bellows while top edge bands 40 and 40a extend along the open top portion of the bellows 37.

A spreader arrangement generally denoted by 41 is supported on top of the vessel 2 as best seen in FIGURE 2 by means of supporting brackets 42 which are welded to the understructure 4 as seen in FIGURE 1. Slidably mounted on the support members 42 by means of brackets 43 are a pair of long thin board-like spreader members 44. The members 44 are slightly longer than the length of the vessel 2 and have slightly tapered ends and their outside edges conform to the shape of the vessel 2 at the point where they contact the vessel 2. A pair of small mounting boards 45 are fixedly mounted to one board of the spreader members and slidably mounted to the other spreader member. Eccentric type jacks 46 are mounted on each mounting board 45. The jacks 46 have a movable piston 47 with a threaded end which is securely fixed to a mounted bracket 48 on the spreader member 44 which has the mounting boards 45 slidably mounted thereto. Thus, by simply clamping the eccentric jacks 46 down to the closed position the spreader members 44 are forced outwardly so that their outer edges are snugly in engagement with the inside top edge of the vessel 2. By moving the jacks 46 to the open positions the spreader members 44 are moved inwardly thereby creating a considerable gap between their outside extremities and the inside top surface of the vessel 2. By varying the position of the piston 47 in relation to the fixed bracket 48 by changing lock nuts 49 and 50, the distance that the spreader members 44 move outwardly can be varied thereby allowing a canopy material of any of a variety of thicknesses to be formed in the vessel 2.

Having described the mechanical construction of the tool the method of operation will now be described. A sheet 52 of multi-axially stretched acrylic of the desired canopy thickness and size is heated and draped to an approximate half cylinder and slid into the vessel 2 normally from the larger or pivotal hoop end of the vessel. It is so placed that one end of the material coincides with the half ring shaped plate 9a of the fixed hoop end of the vessel which plate coincides exactly with the end of the vessel as previously described.

Figure 3:
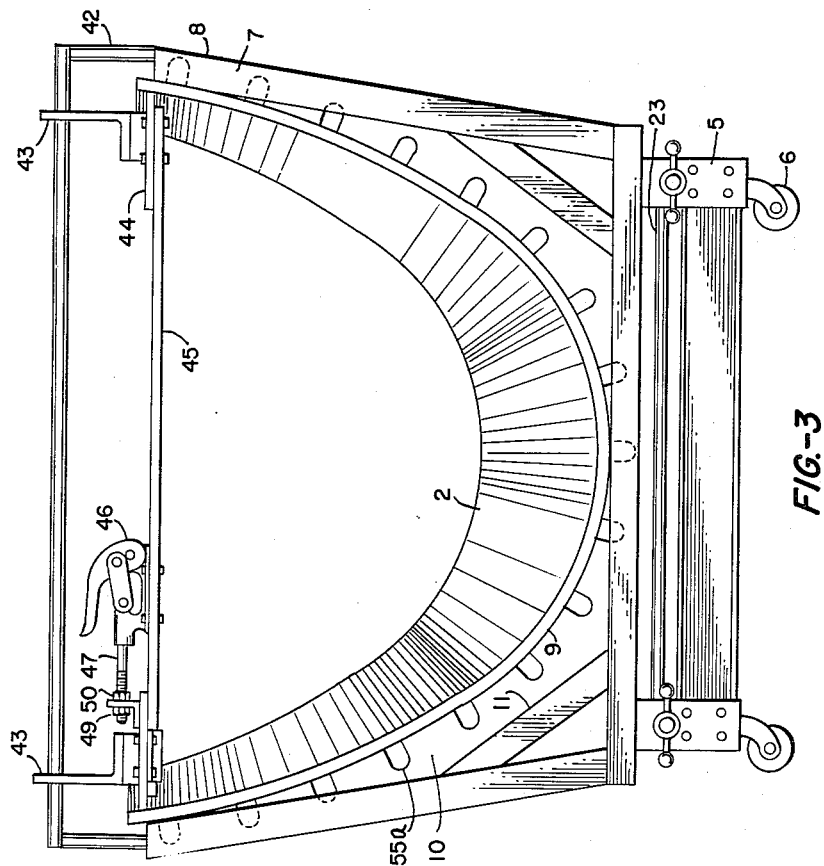
FIGURE 3 is an end elevation of the tool of FIGURE 1 looking at the pivotal hoop end.
Figure 5:
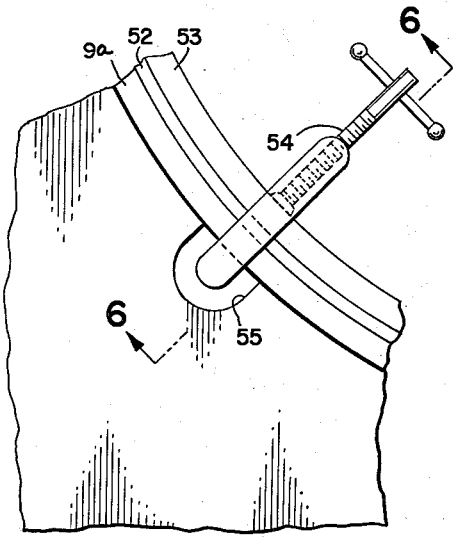
FIGURE 5 is an enlarged fragmentary view of a section of either hoop end showing how the canopy material is held in place by clamp means on the hoop end.
Figure 6:
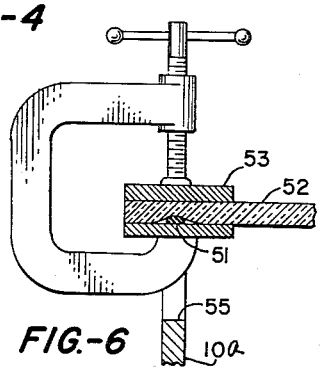
FIGURE 6 is a fragmentary cross sectional view taken on line 6—6 of FIGURE 5.

The canopy material 52 is then clamped in place at the fixed end using C-shaped machinists clamps as more clearly shown in FIGURES 5 and 6. In these drawings the plate 9a corresponds to the plate 9 in the movable hoop end 7 previously described. However, in the fixed end this plate 9a contains a semi-embedded rubber rod 51 which extends the length of the plate 9a as shown in FIGURE 2. The hot acrylic sheet 52 is laid on top of the plate 9a and then a clamp ring 53 of the same width as the plate 9a but slightly smaller in shape is placed on top of the sheet 52. Machinists clamps 54 then fit around the assembled layers and clamp the removable ring 53 against the sheet 52 thereby securely holding the sheet against the fixed plate 9a. The end of the clamp away from the screw extends through a hole 55 in the plate 10a so that a direct and secure clamping is achieved. It is noted that the rubber rod 51 effects an airtight seal on the principle of an O ring to thereby seal the acrylic material at the fixed hoop end of the vessel. With reference to FIGURE 3 it can be seen that there are a plurality of holes 55 extending around the periphery of the hoops thereby insuring that the material will be evenly and uniformly clamped to effect proper sealing and holding action. Normally the surfaces of the ring plate 9a and the clamp ring 53 contacting the acrylic sheet 52 are knurled to provide a better clamping action into the sheet 52 when the sheet is clamped in place by the machinists clamps 54.

Next, the flexible bellows like seal 37 has its band 39 secured around the bottom outside portion of the acrylic sheet 52 and its top bands 40 and 41 secured along the top outside portion of the sheet 52 where it extends above the vessel 2. Usually, the sheet 52 is cut and fitted so that it will extend two to three inches above the top of the vessel 2 so that sealing the strips 40 and 41 along the outside of that portion of the sheet sticking up above the vessel 2 is no problem. The air tight seals between the strips 39, 40, and 41 of the bellows 37 can be achieved by using a one-time-use pressure sensitive tape commercially known as "Celant," which is applied to effect the seal and with the tape being discarded after use.

The remaining unclamped end of the canopy material is now clamped to the pivotal hinged hoop 7 of the tool in the same manner as the clamping described above for the fixed end. However, before so clamping the jack screws 33 are screwed all the way inwardly and the pivotal hoop is closed to its maximum extent toward the fixed hoop and held in place by means of the plate 29 as previously described. Also, the entire pivotal hoop is moved longitudinally toward the fixed hoop as previously described. It is not necessary that there be an air tight seal at this hoop as there was at the fixed hoop because the bellows 37 are effecting the air tight seal between the sheet 52 and the vessel 2 at the pivotal hoop end of the tool. Thus, there is no rubber rod 51 in the plate 9.

Figure 7:
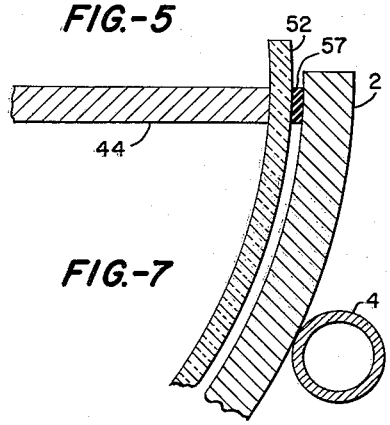
FIGURE 7 is an enlarged fragmentary vertical cross sectional view taken on line 7—7 of FIGURE 2, but showing the canopy material being held in the mold vessel.

Next the spreader device is brought into place and manipulated to force the canopy material outward against the sides of the forming vessel. However, with reference to FIGURE 7, first a long thin piece of pressure sensitive sealing material 57 is coated with a pressure sensitive sealant on both sides and placed between the sheet 52 and the vessel 2 in the same horizontal plane as the spreader members 44 so that when the members 44 are engaged there will be an excellent sealing between the sheet 52 and the vessel 2 all along the top edge of the vessel between the fixed hoop end and the bellows end.

Therefore, by three simple sealing processes (i.e. sealing the fixed hoop end, sealing with the flexible bellows, and sealing with the spreader means) a complete seal has been achieved between the acrylic sheet 52 and the vessel 2 around the edge of the sheet.

Vacuum is now applied by means of conduit 58 connecting to the openings 59 in the bottom of the vessel 2 to establish the integrity of all seals, and any leaks that are found are immediately corrected to insure a vacuum tight seal between the sheet 52 and the vessel 2. After establishing the vacuum, the entire assembly is placed into a heating chamber and brought up to and stabilized at 190° to 230° F. After stabilization of temperature and all the anticipated thermo expansion of the tool and material has taken place the wing nuts 26 are screwed down tightly thereby moving the entire pivotal hoop 7 longitudinally away from the vessel 2 and since the acrylic sheet 52 is fixedly clamped to the hoop 7 this action introduces a small tensile stress into the material. Normally, the use of the wing nuts is just to be sure that the sheet 52 is pulled tightly in the vessel 2 before the forming process begins.

Then a pre-calculated tensile load is introduced into the canopy material by operating the two screw jacks 33 on either side of the tool to pivot the hoop 7 away from the hoop 3. This pivotal movement of the hoop 7 introduces a tensile load into the acrylic sheet 52 in a pattern at right angles to the girth direction of the canopy. The amount of tensile load placed into the sheet 52 is dependent on the material formed, the amount of formation necessary, the heat at which formation takes place, and other minor factors. However, the amount of tensile load introduced into the material can be converted and represented as the amount of torque necessary to turn the screw jacks 33. Therefore, the man operating the tool uses a torque wrench on the screw jacks 33 and introduces the previously calculated amount of torque thereto, thus very closely achieving the amount of tensile stress desired in the sheet 52.

With the sheet pre-stressed as described above, the entire assembly is placed into an autoclave with a vacuum applied between the sheet 52 and the vessel 2 and maintained throughout the remainder of the process. Heat is again applied to stabilize the assembly at 190° to 230° F. When this temperature is reached air pressure is applied at the rate of approximately 1 to 5 p.s.i. per minute until 10 to 20 p.s.i. autoclave air pressure is reached and this pressure is maintained for approximately 10 to 20 minutes. Air pressure is then dumped, the autoclave opened and a man sent into the autoclave with necessary protective clothing and the screw jacks re-torqued again with the torque wrench to the original level as the original torque applied tends to fall off somewhat as the material elongates in the heat of the autoclave while subject to the tensile forces. Forming is then again resumed at a stabilized temperature of about 190° to 230° F. to an ultimate autoclave pressure of 25 to 50 p.s.i. until the canopy material has formed to the contour of the vessel 2. When thus formed the assembly is removed from the autoclave with the vacuum still applied and is then naturally cooled slowly with the vacuum still being applied, or with the vacuum released as the circumstances demand.

In performing the process, usually the inner surface of the vessel 2 has been treated in known manner to avoid optically impairing the formed material. This method of applying a tensile stress during forming has proved very successful on canopies having a deep draw because under the conventional vacuum forming methods compression forces forming at the edges of the material where the material is sealed to the mold tend to extend downwardly into the material causing compression buckles to appear in the formed material and thereby greatly reducing the visibility through the material. In the process described the simple introduction of tensile load cancels out or even overrides all compression buckles thereby creating a canopy having superior optical qualities. After forming and cooling a waste area of about 6 inches of the fixed hoop end and of about 1 foot at the movable hoop end are cut from the canopy to give the finished product. The entire understructure 4 and supporting frame 5 of the assembly tool 1 are made from aluminum which metal has expansion characteristics very similar to the acrylic material to be formed thereby greatly minimizing any warpage or distortion in the vessel 2 during the forming process.

The entire process takes place at temperatures considerably lower than those at which the acrylic was stretched so that the acrylic material does not tend to return to its original condition during the process.

The flexible bellows seal 37 combined with the spreader device 42 allow the acrylic sheet 52 to slide longitudinally in the vessel 2 during the forming process while still maintaining the seal between the vessel 2 and the sheet 52.

While in accordance with the Patent Statutes one best known embodiment of the invention has been illustrated and described in detail, it is to be particularly understood that the invention is not limited thereto or thereby, but that the inventive scope is defined in the appended claims.

What is claimed is:

1. In an apparatus for forming an aircraft canopy, the combination of a rigid frame-like understructure, a cavity or mold vessel fixedly supported by the understructure, a half-hoop shaped plate affixed to the understructure and to one end of the vessel, a half-loop shaped pivotally and longitudinally slidably mounted to the understructure at the other end of the vessel, means to pivot the pivotal hoop away from the fixed hoop, means to longitudinally slide the pivotal hoop away from the fixed hoop, means to clamp a canopy material into both the fixed hoop and the pivotal hoop, means to seal all spaces around the edge of the vessel between the vessel and the canopy material, and means to draw a vacuum between the canopy material and the vessel.

2. In an apparatus for forming an aircraft canopy, the combination of an integral rigid frame-like understructure having vertically upwardly extending integral sides, a cavity or mold vessel firmly supported by the understructure, a half-loop shaped plate affixed to the understructure and to one end of the vessel, a half-hoop shaped plate pivotally and longitudinally slidably mounted at its closed bottom portion to the understructure at the opposite end of the vessel from the fixed half-hoop plate, means to clamp a canopy material into both the fixed hoop and the pivotal hoop so that said material extends somewhat above the sides of the vessel, a plurality of jacking screws secured to the upwardly extending sides of the understructure adapted to displace the pivotal hoop around its pivot point away from the fixed hoop, spreader means mounted on top of the upwardly extending side members of the understructure to seal the top edge of the material in relation to the top edge of the vessel, means to insure a seal on the material clamped into the fixed hoop, flexible U-shaped bellows means with one end fixedly attached and sealed to the outside of the vessel at the pivotal hoop end thereof, the top and other end of said bellows having bands thereon adapted for sealing with the canopy material extending from the top and the end of the vessel, a plurality of small holes through the vessel, a plurality of fittings adapted to said holes on the outside of said vessel, said fittings adapted to a conduit for connection to a vacuum manifold.

3. In an apparatus for forming an aircraft canopy or the like, female mold means adapted to receive a plastic sheet of trough shape, means for sealing fluid-tight one end of the sheet to one end of the mold means, means for sealing fluid-tight the edges of the sheet to the sides of the mold means, pivotally mounted means for gripping the other end of the sheet and for applying longitudinal tension thereto, flexible means for sealing fluid-tight between the gripping means and the mold means, and means for applying differential fluid pressure to opposite sides of the tensioned sheet to move the sheet into engagement with the mold means when the sheet is heated.

4. Apparatus for forming an aircraft canopy or the like from a pre-stretched acrylic sheet which comprises a trough-shaped molding surface adapted to have the sheet draped therein, separate means for gripping the opposite ends of the sheet, means for sealing between the molding surface and all ends and sides of the sheet, means for moving the separate gripping means relatively away from each other to longitudinally tension the sheet, and means for applying a vacuum between the sheet and the molding surface to draw the sheet into engagement with the molding surface when the sheet is heated.

References Cited in the file of this patent
UNITED STATES PATENTS

| | | |
|---|---|---|
| 2,468,697 | Wiley | Apr. 26, 1949 |
| 2,700,007 | Dennison et al. | Jan. 18, 1955 |